(12) United States Patent
Champion

(10) Patent No.: US 6,276,735 B1
(45) Date of Patent: Aug. 21, 2001

(54) TOOLBOX WITH BUILT-IN ROLL-TOP TONNEAU COVER

(76) Inventor: Jedd Champion, 17717 Vail St. #221, Dallas, TX (US) 75287

( * ) Notice: Subject to any disclaimer, the term of this patent is extended or adjusted under 35 U.S.C. 154(b) by 0 days.

(21) Appl. No.: 09/592,942

(22) Filed: Jun. 13, 2000

Related U.S. Application Data

(60) Provisional application No. 60/145,139, filed on Jul. 23, 1999.

(51) Int. Cl.[7] ............................. B60R 5/04; B60R 9/06; B60R 11/06; B60J 7/02
(52) U.S. Cl. ............... 296/37.6; 296/98; 296/100.06; 296/100.09; 296/100.1
(58) Field of Search ..................... 296/100.01, 100.06, 296/100.08, 100.09, 100.1–100.16, 98, 37.5, 37.6, 37.16; 160/235

(56) References Cited

U.S. PATENT DOCUMENTS

| | | | |
|---|---|---|---|
| 4,138,154 | * | 2/1979 | McKeon .................................. 296/98 |
| 4,210,361 | * | 7/1980 | Marvin et al. ....................... 296/210 |
| 4,273,377 | | 6/1981 | Alexander . |
| 4,438,605 | * | 3/1984 | DeLucia ................................... 52/71 |
| 4,611,848 | | 9/1986 | Romano . |
| 4,784,427 | | 11/1988 | Burgess . |
| 4,786,099 | | 11/1988 | Mount . |
| 4,795,206 | | 1/1989 | Adams . |
| 4,807,921 | | 2/1989 | Champie, III et al. . |
| 4,889,381 | * | 12/1989 | Tamblyn et al. ....................... 296/98 |
| 5,040,843 | | 8/1991 | Russell et al. . |
| 5,251,950 | | 10/1993 | Bernardo . |
| 5,257,850 | | 11/1993 | Brim . |
| 5,330,246 | * | 7/1994 | Bernardo ................................ 296/98 |
| 5,350,213 | | 9/1994 | Bernardo . |
| 5,758,921 | * | 6/1998 | Hall ........................................ 296/98 |
| 6,030,021 | * | 2/2000 | Ronai ..................................... 296/98 |
| 6,053,556 | * | 4/2000 | Webb ..................................... 296/98 |

FOREIGN PATENT DOCUMENTS

| | | |
|---|---|---|
| 2027646 | 2/1980 | (GB) . |
| 2268718 | 1/1994 | (GB) . |

\* cited by examiner

*Primary Examiner*—Joseph D. Pape
*Assistant Examiner*—Greg Blankenship

(57) ABSTRACT

A toolbox with a built-in-roll-top tonneau cover for installation within an open cargo bed of a pickup truck. The toolbox in one configuration is a rectangular shaped tool-box having in combination a cigarette lighter adaptor and a roll top tonneau cover. The roll-top cover is rotatably mounted and secured within a concealed rear portion of the tool box. A special lock mechanism secures the cover to the tailgate in an extended state which protects concealed items from theft and weather. The roll top tonneau is uniquely formed by a plurality of successive and interconnected slats via a reinforced rubber connecter assembly. Each of the plurality of slats is attached to a first and second, respective adjoining edge by a successive or adjacent slat. The adjoining edges are formed of a first and second tapered channel for fictionally securing the reinforced rubber connector assembly therebetween. In another arrangement each adjoining edge includes an extension edge portion and a mating recessed edge portion for successive connection with an adjacent slat as a reinforced connection. A set U-shaped guides are mounted on the top edges of the side walls of the cargo bed and extend from the front portion of the cargo bed for providing virtually friction free contact therebetween. The roll-top tonneau cover is activated via a spring-loaded rotating shaft which assists in returning the cover to a retracted position.

8 Claims, 10 Drawing Sheets

TOOLBOX WITH BUILT-IN ROLL-TOP TONNEAU COVER

CROSS-REFERENCE TO RELATED APPLICATION

This application claims the benefit of U.S. Provisional Patent Application Ser. No. 60/145,139, filed Jul. 23, 1999.

BACKGROUND OF THE INVENTION

1. Field of the Invention

The present invention relates generally to truck bed covers. More specifically, the invention is a combination tool box and roll top tonneau cover for pickup truck cargo beds.

2. Description of Related Art

Numerous types of truck bed covers are commonly used over the utility bed portion of a pickup truck to protect the bed including cargo items disposed therein. Conventional coverings such as those made from cloth, canvas, vinyl or similar fabrics are known in the industry to provide limited and inexpensive protection. However, material degradation has been the major disadvantage of these types of coverings. Over time, the repair and replacement history for the cloth type coverings become costly. Another disadvantage in the cloth type coverings is they typically serve only to conceal cargo items beneath the cover. Such limited security may be defeated by simply releasing or cutting the fabric.

Other apparent disadvantages of the cloth type truck covers include shrinkage, fading, and etc. to name a few. Fiberglass and metal enclosures are also used which typically provide a raised roof over the truck bed. However, such an enclosure limits the use of the truck to items that will fit within the enclosure only. This arrangement leaves only access to areas of the bed via the tailgate area which is inconvenient for many applications. The toolbox with built in tonneau as described herein provides an improved tonneau which is weather resistant and/or impervious to moisture and laden effects of rust and corrosion. Unlike conventional roll type covers, the combination toolbox and tonneau provides compact and flexible interconnected slats having a unique structural composition which reduce dynamic vibratory noise or rattling prevalent with hinged and similarly connected slats extensively used in the prior art.

For example, U.S. Pat. No. 4,273,377 issued to Alexander discloses a tonneau cover apparatus for pickup trucks which includes an elongated track secured to the sides of a pickup. Ribs or cross members are used between the tracks which extend across the bed of the pickup and secured to bearing guides movable on each track. A tonneau cover made of vinyl is attached to the front end of the truck bed and extends towards the tailgate along the length or longitudinally with respect to the pickup truck on the pair of tracks secured to the walls of the pickup bed.

U.S. Pat. No. 4,611,848 issued to Romano discloses an improved sliding cover assembly for converting the open body of a truck, or the like, to a closed body. The assembly comprises an articulated-type cover slidably mounted within a pair of parallel tracks having a C-shaped cross-section. The cover includes a plurality of rectangular panels successively disposed adjacent to one another and extending across the open body. Each panel includes a first semi-cylindrical edge portion and a second, semi-cylindrical edge portion having a radius larger than the radius of the first edge portion. The first edge portion is concentric with, and, rotatably received by the second edge portion of the adjacent panel. A plurality of such panels are arranged to extend the length of the cargo bed.

U.S. Pat. No. 4,784,427 issued to Burgess discloses a roller type enclosure assembly for open bed trucks wherein the enclosure is mounted as a spring loaded mechanism which provides tension within a series of interconnected slats. A "stowage" box houses the interconnected slats in a coiled configuration via a spring loaded cable and pulley assembly. U.S. Pat. No. 4,786,099 issued to Mount discloses a similar truck bed cover device, however, the cover involves a complex gear system or sprocket for moving the cover from an extended and retracted position.

U.S. Pat. No. 4,795,206 issued to Adams discloses a truck bed cover system which utilizes a roll type cover driven by a system of gears and pulleys for moving the cover in both a retracted and extended position. The cover is comprised of a series of interconnected slats which form a substantially saw-tooth configuration for engaging a saw-tooth gear driver to provide the necessary traction for extending and retracting the cover. U.S. Pat. No. 5,040,843 issued to Russel et al. discloses a similar roll type bed cover having a complex drive mechanism for extending and retracting the cover. The system is mounted to provide a clearance for inserting an optional toolbox.

U.S. Pat. No. 4,807,921 issued to Champie, III et al. discloses a sliding cover assembly which is mounted on the top edge of the side walls of the cargo bed and includes a plurality of longitudinal, arcuate parallel-disposed slats. Each slat is rotatably interconnected with an adjacent slat which slides on a low friction surface within a set of guide rails attached to the side walls of the cargo bed. A lock-plate for securing the cover to the bed is also disposed on the leading edge of the sliding cover co-planar therewith.

U.S. Pat. No. 5,257,850 issued to Brim discloses an indented bed-liner having a motor housing and connecting rod assembly for activating and transmitting a cover connected thereto in a forward and reverse direction. The motor housing is provided with an opening which faces in the direction of the tailgate. The opening is planar with first and second indents for directing the cover through the opening. As the guide rod is urged forward the cover unwinds from a rotating rod and extends through the opening in the motor housing. The rotary motor which directs the cover in both forward and reverse directions is activated via a push button switch mounted within the cab or a panel of a truck.

U.S. Pat. Nos. 5,251,950 and 5,350,213 issued to Bernado disclose a rolling cover with guide track clamps, and an apparatus for positioning, latching and locking a retractable bed cover, respectively. Other conventional cover type features for trucks are disclosed in Great Britain Patents (GB 2,027,646 and GB 2,268,718). In particular, the Great Britain Patent issued to Pavlou discloses a canopy styled flexible cover for heavy duty transport vehicles which transports gravel, sand and building materials.

None of the above inventions and patents, taken either singly or in combination, is seen to describe the instant invention as claimed.

SUMMARY OF THE INVENTION

The toolbox with built-in-roll-top tonneau cover according to the invention is constructed for easy and simple installation within an open cargo bed of a pickup truck. The toolbox in one configuration is a recessed tool-box formed in combination with a roll top tonneau cover. A cigarette lighter/power adaptor is mounted within the tool-box compartment for external use. The roll-top cover is rotatably mounted and secured within a concealed rear exterior portion of the tool-box to form a single unitary tool-box structure. A special lock mechanism secures the cover in an extended state to the tailgate for securing and protecting concealed items from the weather. The roll top tonneau is uniquely formed by a plurality of successive and interconnected slats via a connecter assembly made of a composite rubber or other composite material. Each of the plurality of slats is attached to a first and second, respective adjoining edge by a successive or adjacent slat. The adjoining edges are formed of a first and second tapered channel for frictionally securing the reinforced rubber connector assembly therebetween. In another arrangement, each adjoining edge includes an extension edge portion and a mating recess edge portion for successive connection with an adjacent slat as a reinforced connection. A set of U-shaped guides are mounted on the top edges of the side walls of the cargo bed, and extend from the front portion of the cargo bed providing virtually frictionless contact therebetween. The roll-top tonneau cover is activated via a spring-loaded rotating shaft to assist a user in returning the tonneau cover to a retracted position. An auxiliary rotating mechanism is also mounted therewith for manually retracting the cover in the event such is needed.

Accordingly, it is a principal object of the invention to provide a toolbox and built-in-roll-top tonneau cover for truck cargo beds.

It is another object of the invention to provide a toolbox and built-in-roll-top tonneau cover which maximizes cargo and tool storage space.

It is a further object of the invention to provide a toolbox and built-in-roll-top tonneau cover which minimizes weight requirements and dynamic vibrations associated with the cover, particularly between and along interconnected slats.

Still another object of the invention is to provide a toolbox and built-in-roll-top tonneau cover which is structurally sound and impervious to moisture laden effects such as rust and corrosion.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a toolbox 9 with built-in-roll-top tonneau cover 9a for an open cargo bed C of a truck, which is shown in phantom lines in FIGS. 1–3 and 6. The cargo bed C is defined by a substantially flat bottom F, two side walls W, a front wall D at the front portion of the cargo bed and a tailgate G at the rear portion of the cargo bed. The preferred embodiments of the present invention are depicted in FIGS. 1–8.

Figure 1:
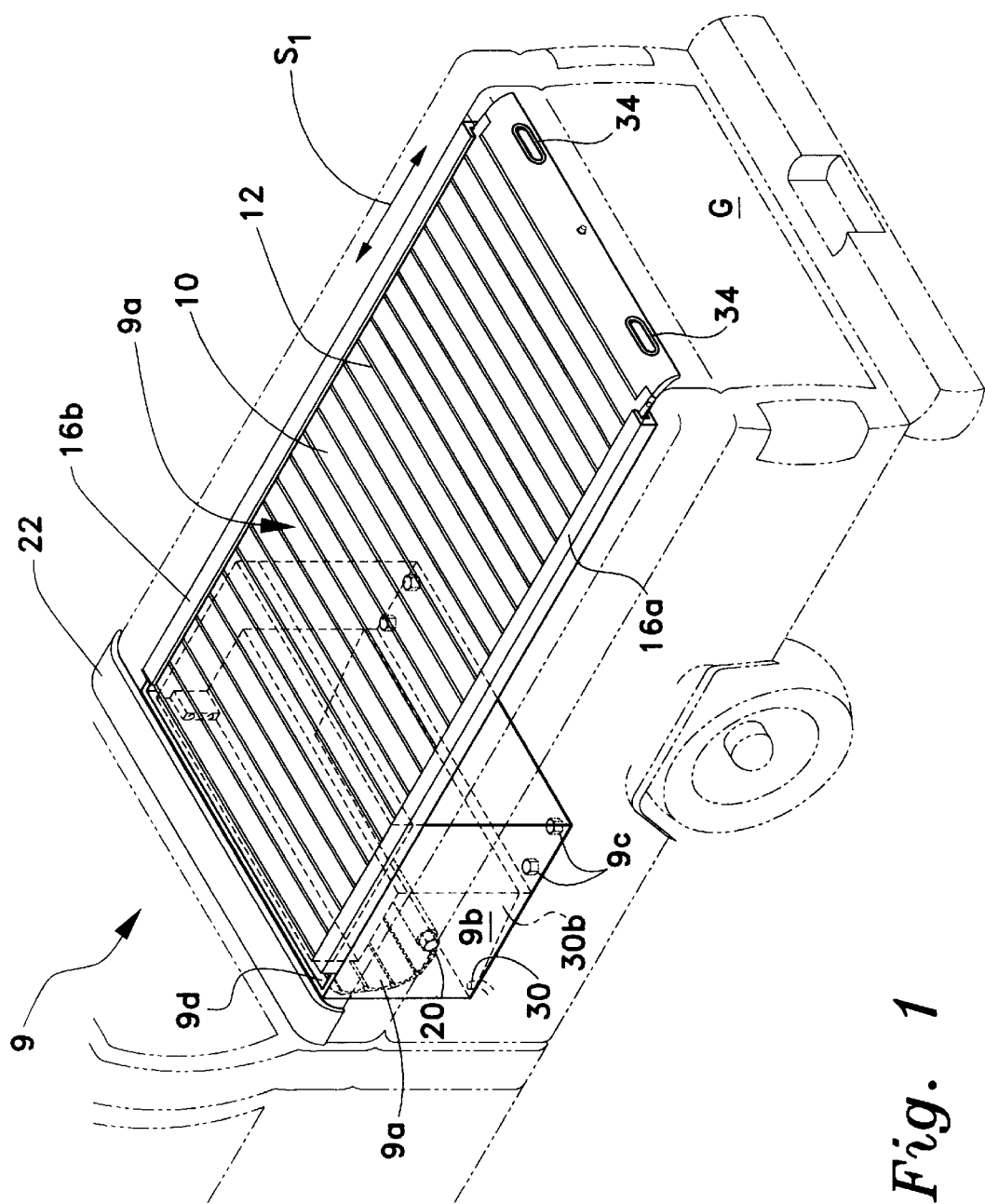
FIG. 1 is an environmental, perspective view of a toolbox with built-in-roll-top tonneau cover according to the present invention.
Figure 2:
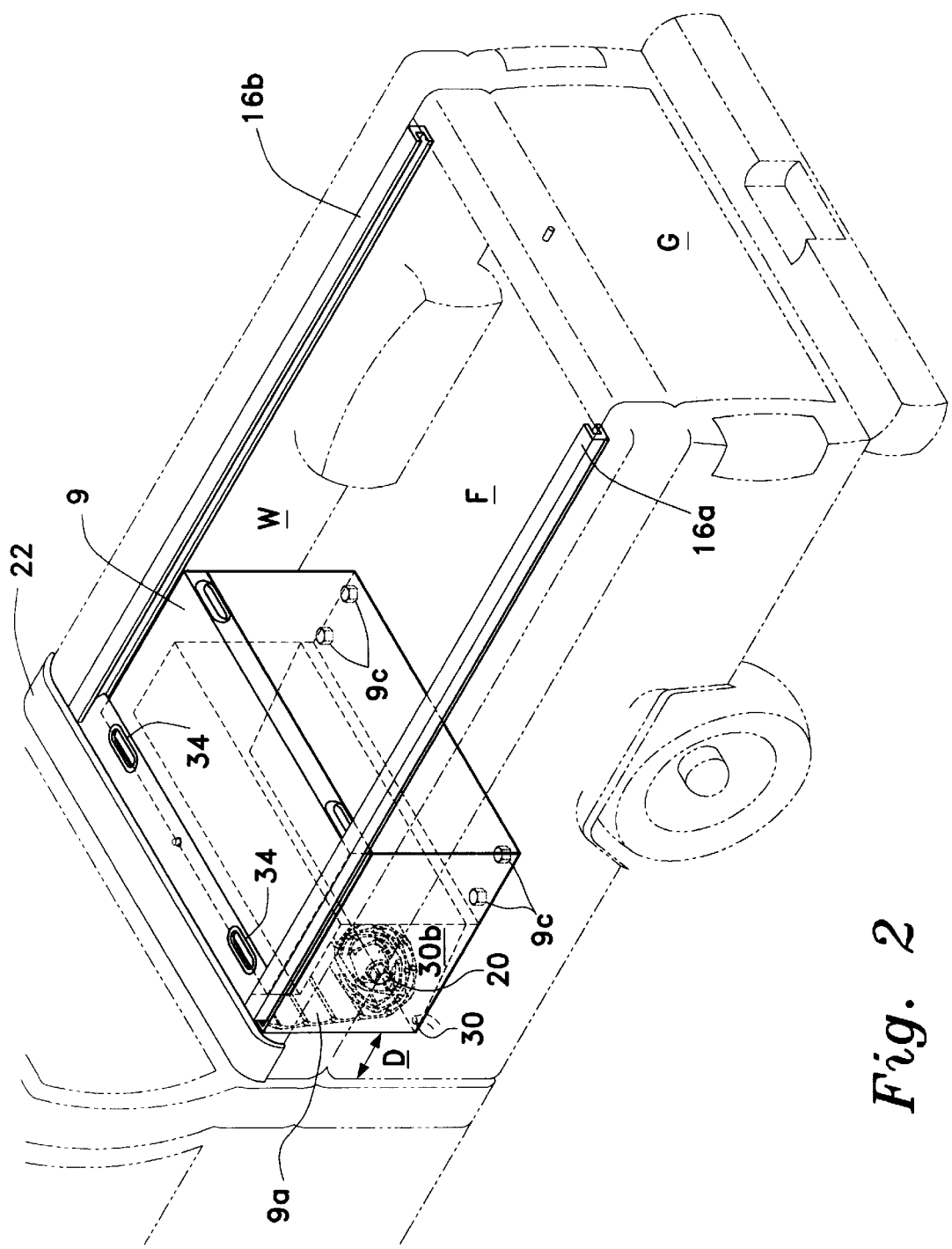
FIG. 2 is a perspective view of FIG. 1, illustrating a recessed tool-box and the roll-top tonneau cover in a retracted position according to the invention.
Figure 3:
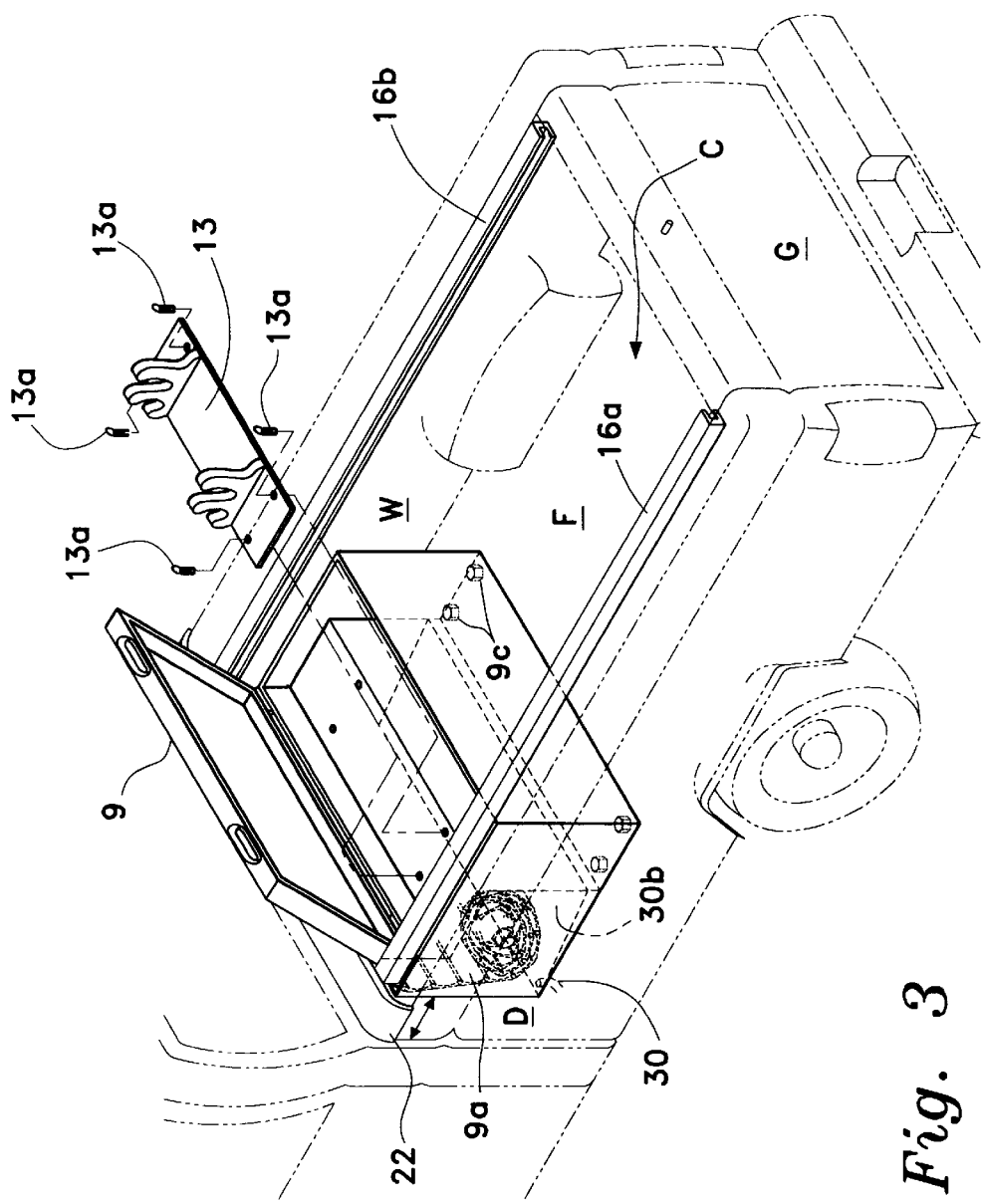
FIG. 3 is an exploded perspective view of the toolbox with built-in-roll-top tonneau cover according to the invention, illustrating an internal rack and storage cavity for the toolbox according to a first embodiment.

As best seen in FIGS. 1–3, according to the first embodiment of the invention, the toolbox 9 having a built-in-roll-top tonneau cover 9a comprises a single integrated tool-box structure wherein the cover 9a is rotatably mounted and secured within a concealed rear exterior portion 9b of the tool-box 9, and operatively conceals both the toolbox and cargo bed when removed from a top access way 9d in an extended state $S_1$. The roll top tonneau cover 9a is constructed of a plurality of successive and interconnected slats 10, wherein each of the plurality of interconnected slats 10 comprises a reinforced rubber connector assembly 12 on neighboring sides.

Each of the plurality of slats 10 is substantially arcuate in shape and includes a first 10a and second 10b adjoining edge. Each adjoining edge 10a, 10b comprises a respective first $10a_1$ and second $10b_1$ tapered channel for securing by friction the reinforced rubber connector assembly 12 therebetween (Refer to FIGS. 4A–4C). As diagrammatically illustrated in FIG. 4A, according to a first embodiment, the reinforced rubber connector assembly 12 comprises a first 12a and second 12b substantially U-shaped bracket and a reinforced rubber element 12c. The reinforced rubber element 12c is substantially rectangular in shape and selectively includes reinforced metal particles (e.g. rods, particle strands, etc.) for adding a certain level of rigidity to the element 12c. In compact and/or interconnected form, the U-shaped brackets 12a, 12b and element 12c insertably mate at adjoining ends, and are compressed between successive edges 10a and 10b, respectively via the respective tapered channels. Interstitial chemical bonding agents or sealants can be used in the manufacturing process to reduce microscopic air pockets or unwanted gaps between mating surfaces of each respective channel.

Figure 4A:
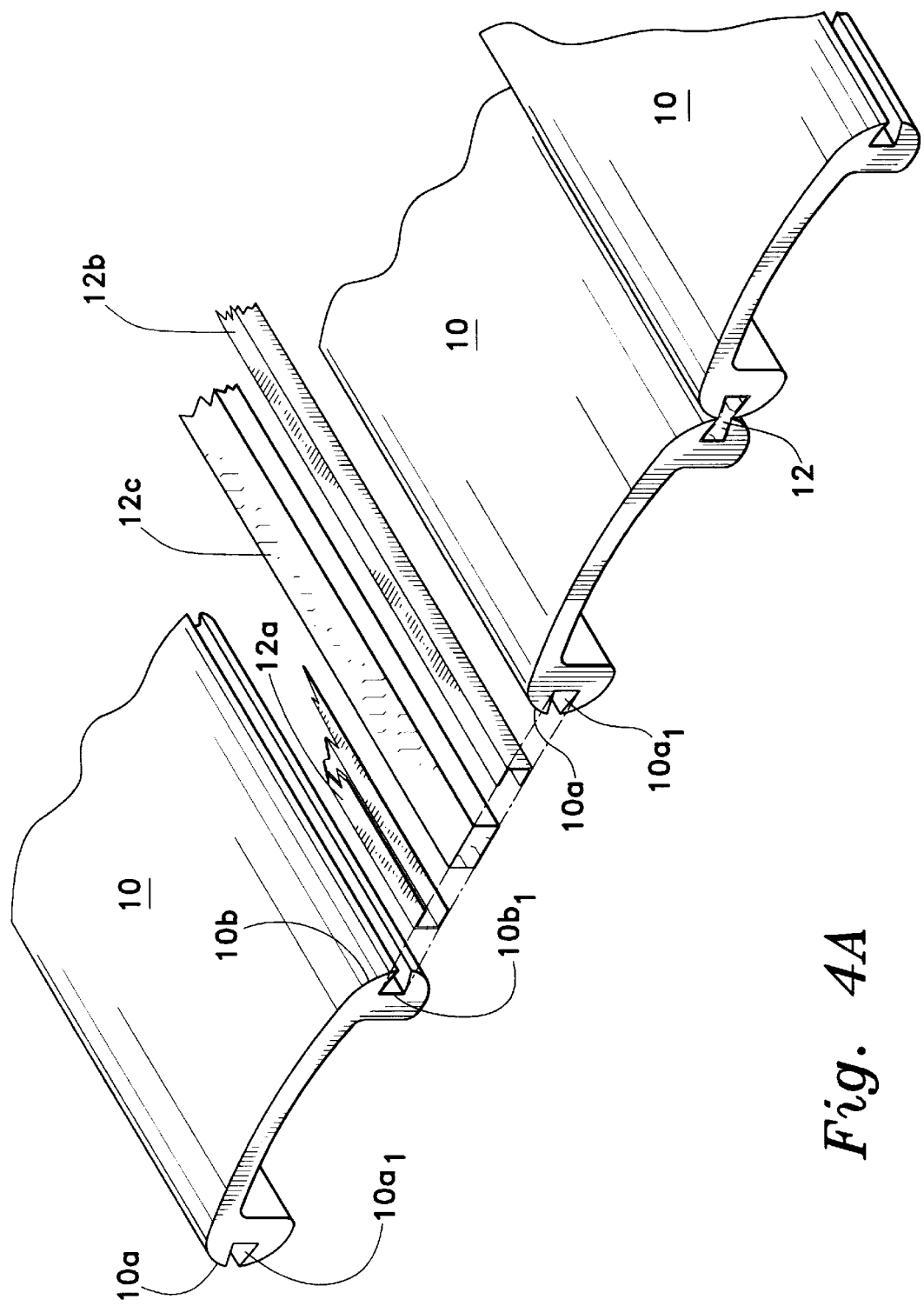
FIG. 4A is a perspective view of the interlocking roll top slats of the tonneau cover according to a first embodiment.
Figure 4B:
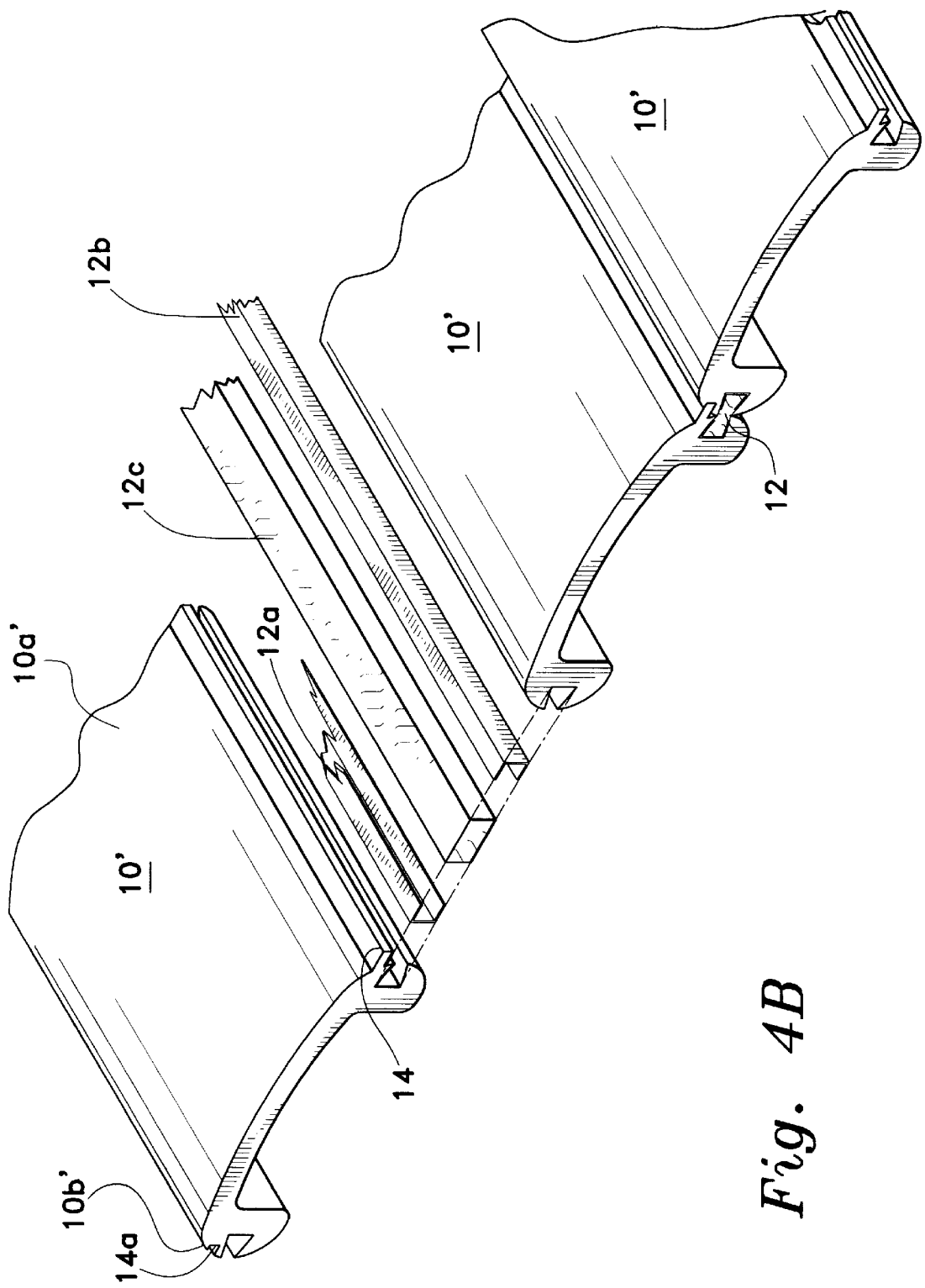
FIG. 4B is a perspective view of the interlocking roll top slats of the tonneau cover according to a second embodiment.
Figure 4C:
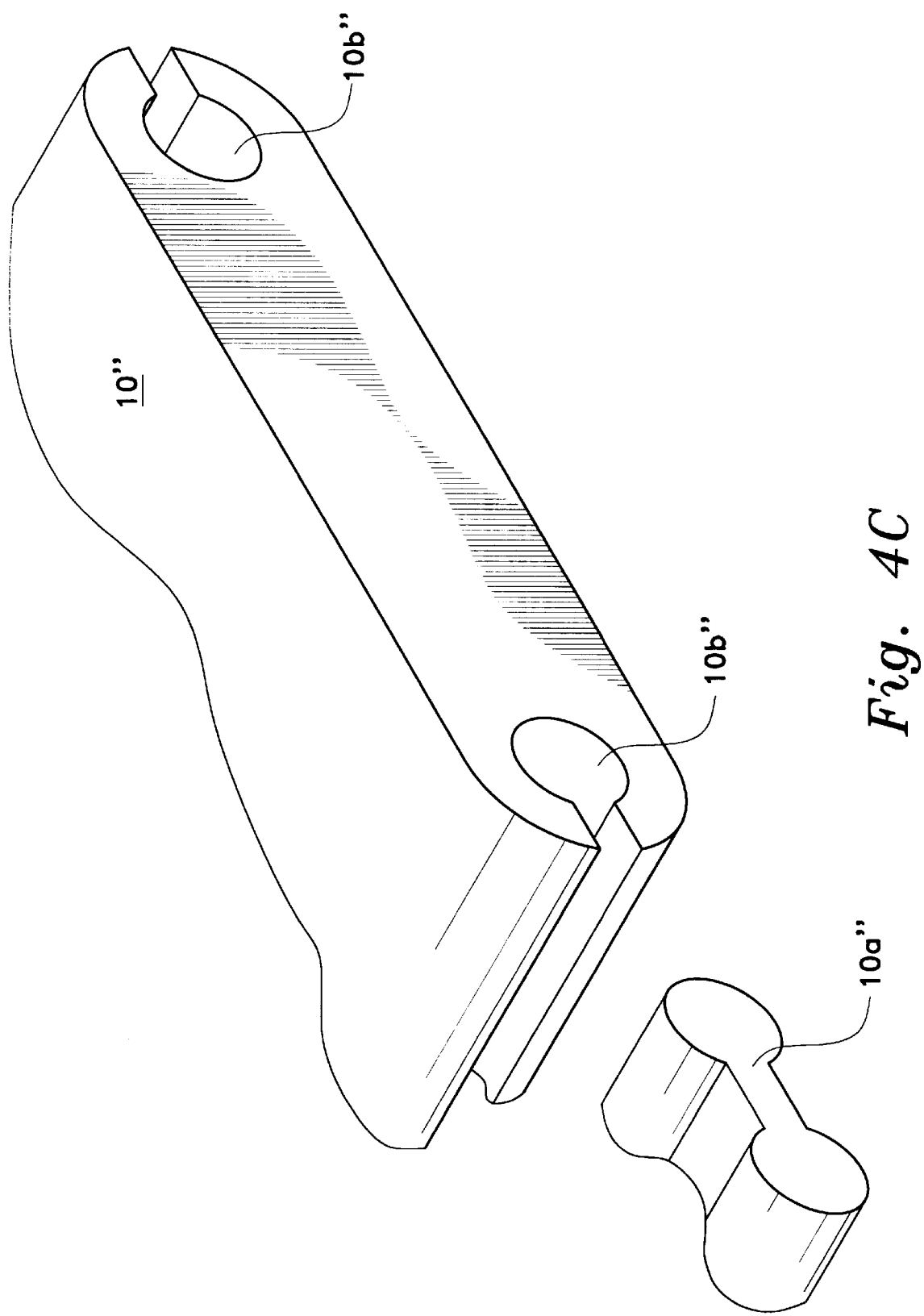
FIG. 4C is a perspective view of the interlocking roll top slats of the tonneau cover according to a third embodiment.
Figure 5:
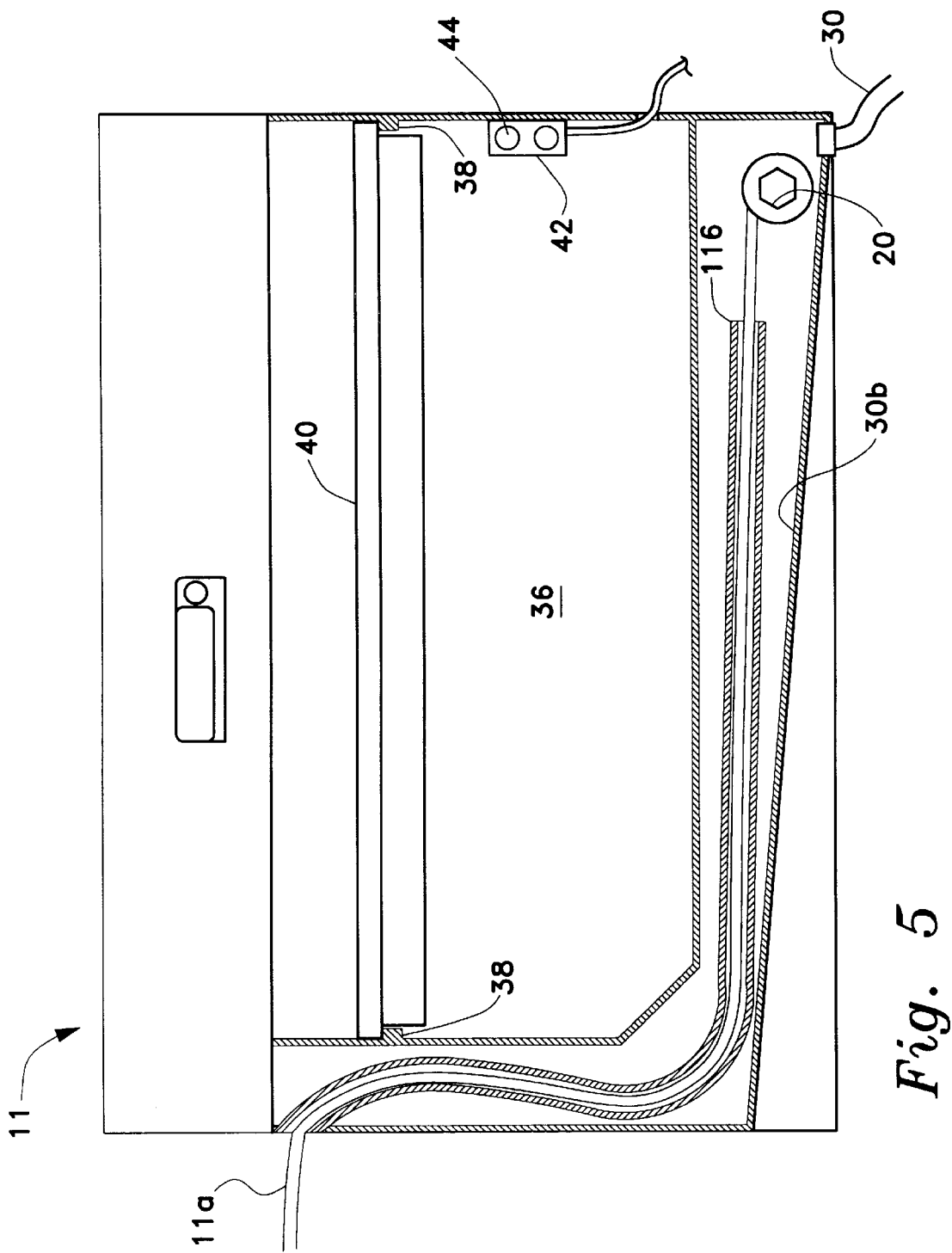
FIG. 5 is a perspective side sectional view of a toolbox with built-in-roll-top tonneau cover according to a second embodiment of the invention.
Figure 6:
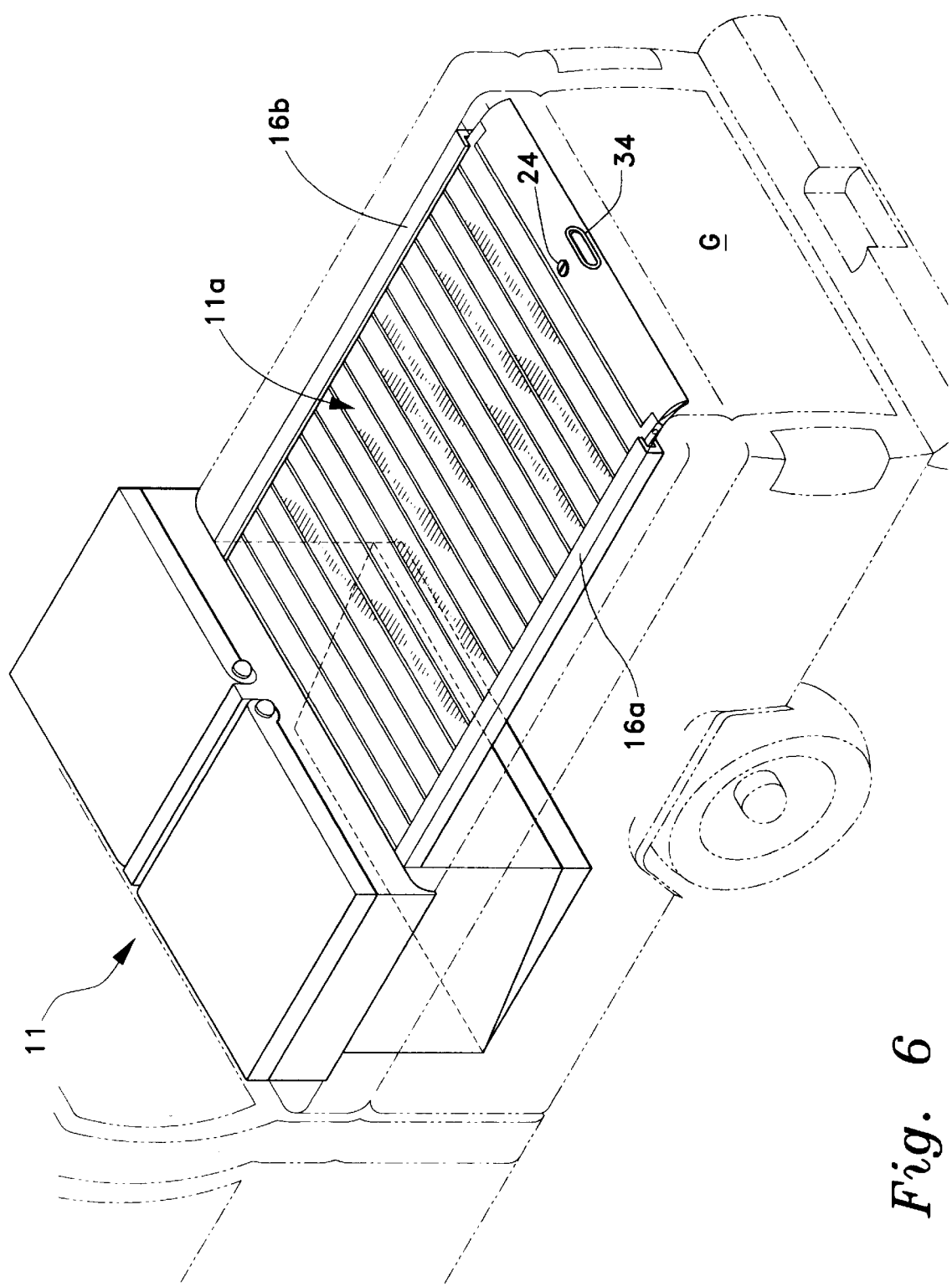
FIG. 6 is an environmental, perspective view of a toolbox with built-in-roll-top tonneau cover according to the second embodiment of the invention.
Figure 7:
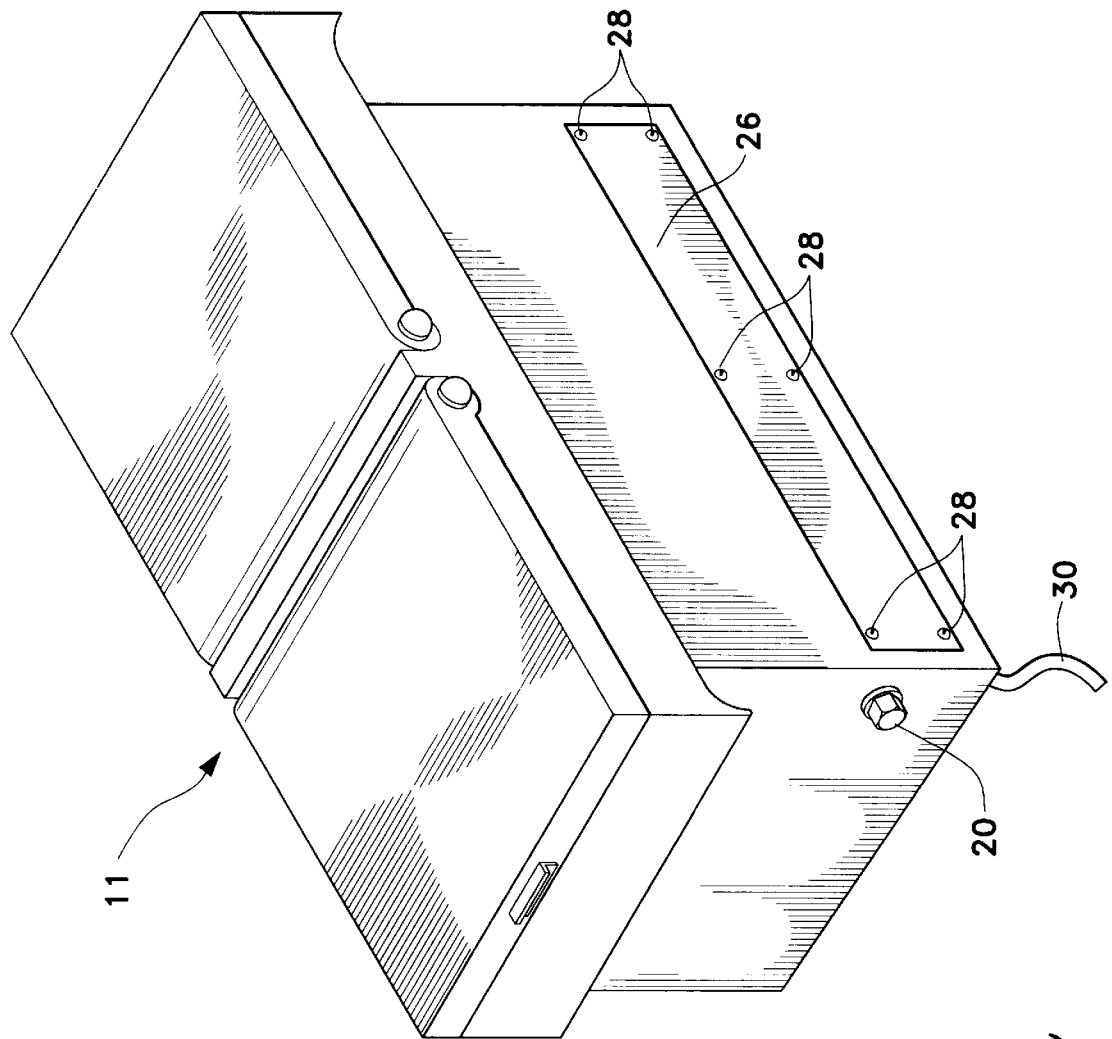
FIG. 7 is a perspective view of the toolbox with built-in-roll-top tonneau of FIG. 6, illustrating a rear access panel and drain line according to the invention.

According to a second embodiment, FIG. 4B diagrammatically illustrates a plurality of interconnected slats 10', wherein an extension edge or tongue 14 has been included on the edge 10a' and a corresponding recess or groove 14a disposed on the other edge 10b' of the slat 10' which prevents water or rain accumulation within the reinforced rubber assembly 12 at the interface of each respective adjoining edge enclosure 10a' and 10b', respectively. As seen therein, similar tapered channels are formed within each respective edge 10a' and 10b' as similarly illustrated in FIG. 4A. A third embodiment of the slat 10" is diagrammatically illustrated in FIG. 4c having a single reinforced interstitial rubber connector 10a″ and recess slot 10b″ for receiving the connector therein. This particular configuration allows for a greater degree of rotation at the interface of the connector and respective slat 10″.

In the fully extended mode or state $S_1$ shown in FIG. 1, the cover 9a is constrained by a guide means mounted on the top edges of the side walls W of the cargo bed C, wherein the guide means substantially extend from the front portion to the rear portion of the cargo bed, and include a first 16a and second 16b U-shaped track. Each respective track 16a, 16b is manufactured having a preselected coefficient of friction for minimizing friction between contact surfaces of the cover 9a and a respective or corresponding contact surface of each track 16a, 16b.

The cover 9a is rotatably retracted by a spring-loaded return means or mechanism as is well known by one having ordinary skill in the relevant art. An auxiliary mechanical retracting means or mechanism 20 may be used in combination with the spring-loaded return mechanism in case of mechanical failure or as an optional means of retracting the cover 9a. Access to the mechanism 20 is veiled by an access panel 22 disposed adjacent to the front wall D of the cargo bed and spanning the first and second tracks 16a and 16b. Accordingly, the toolbox 9 is preferably recessed or low profiled and includes an interior mounting rack 13 for mounting a variety of utility or sporting devices (e.g. rifles, fishing rods, walking canes etc.), including tools. The interior rack 13 is secured to the toolbox 9 via a plurality of temporary or removable plastic mechanical fasteners 13a. The toolbox 9 is also secured by mechanical fasteners, preferably bolt fasteners 9c.

Figure 8:
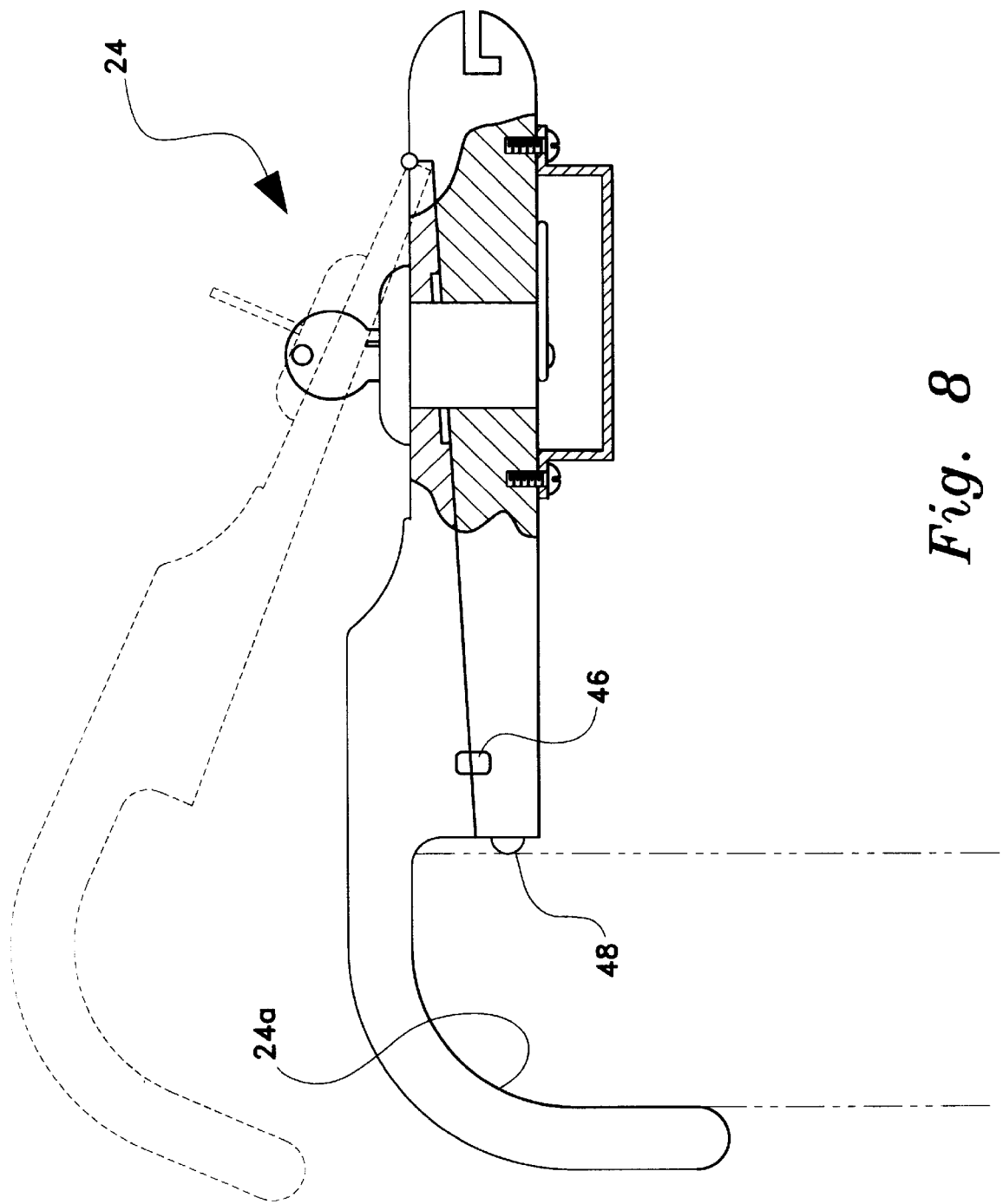
FIG. 8 is a perspective view of the roll-top tailgate and handle, lock and latch mechanism according to the invention.

As best seen in FIGS. 5–8, the toolbox 11 according to the second embodiment of the invention is diagrammatically illustrated as a high profile toolbox 11, comprising the built-in-roll-top tonneau cover 11a, which is constrained within a virtually frictionless curvilinear channel 11b, adapted with a special lock mechanism 24 as diagrammatically illustrated in FIG. 8. The mounting arrangement of the cover 11a is very similar to that according to the first embodiment, except that the tool-box 11 has a central side opening for extending and retracting the cover 11a therethrough. Guides of similar construction to that of the first embodiment are used to constrain the cover 11a along the length of the cargo bed, within a virtually frictionless surface as similarly recited above. For quick and easy access, an access panel 26 is mechanically secured via mechanical screw fasteners 28 disposed along a bottom rear portion of the toolbox 11. An internal storage compartment 36 is shown having peripheral or alternatively front and back ridges 38 for mounting a tray 40 thereon. A cigarette lighter/power adaptor 42 is mounted within the tool-box compartment 36 for use as an external auxiliary power source. A single socket 44 or dual socket arrangement can be used depending on the power requirements of the user. The socket is electrically connected through the cabin of the pickup for appropriate electrical connections. Such connections are considered to be well within the knowledge of one having ordinary skill in the art to perform. As similarly recited above an auxiliary mechanical retracting means or mechanism 20 is formed in combination with the toolbox for use in cases of mechanical failure or as an optional feature. A drain line 30 is also shown and is standard for each embodiment of the invention for removing accumulated liquid from the interior of the toolbox 11. An interior inclined bottom plane 30b facilitates in conveying the liquid towards the drain line 30. The bottom rear portion of the tool-box 11 is preferably disposed a predetermined distance from the front wall to provide a clearance for user access to the cover for repairs or alternative storage space, etc.

Other special features common to both embodiments of the invention are the use of gripping apertures 34 for extending the each respective cover 9a and 11a, respectively, and the use of perforated teeth within the reinforced rubber assembly to provide for a more secure grip between the rubber element and the U-shaped tracks. In addition, the slats are preferably made out of a weather resistant material which is impervious to rust and/or corrosion. Suitable materials include aluminum, stainless steel, graphite, composite plastic materials or similar materials. The toolbox built-in-roll-top tonneaus is specially constructed with a reinforced rubber assembly which minimizes or dampens dynamic vibration throughout the structure. The cover can also be made having a central aperture which secures the cover to existing lock mechanisms disposed on the tailgate by insertion. The lock mechanism 24 also includes rubber seals 46 for reducing wear and moisture accumulation. A rubber bumper 48 has also been added to reduce impact with the tail gate. Rubber strips can also be used along the interface where the top interior surface portion 24a of the lock 24 meets with the tailgate.

It is to be understood that the present invention is not limited to the sole embodiments described above, but encompasses any and all embodiments within the scope of the following claims.

I claim:

1. A toolbox with built-in-roll-top tonneau cover for a truck having an open cargo bed defined by a substantially flat bottom having a front portion and a rear portion, two side walls, a front wall at the front portion and a tailgate at the rear portion, comprising:

a toolbox adapted to be secured to the bottom of the cargo bed at the rear portion, said toolbox having a concealed rear portion;

a roll top tonneau cover rotatably mounted and secured within the concealed rear portion of the tool box to form a single unitary tool-box structure, whereby the cover operatively conceals both the toolbox and cargo bed in an extended state, said roll top tonneau cover having a plurality of successive and interconnected slats, each of said plurality of interconnected slats includes a reinforced rubber connecter assembly for interconnecting each of said plurality of slats at a first and second adjoining edge, said first and second adjoining edge having a respective first and second tapered channel for frictionally securing the reinforced rubber connector assembly therebetween;

a first and second U-shaped track, each said track substantially extending from the front portion to the rear portion of the cargo bed and adapted to be respectively mounted on top edges of the two side walls, each said track having a preselected coefficient of friction for minimizing friction between contact surfaces of the cover and each track;

spring-loaded return means for returning the tonneau cover to a retracted position within the concealed portion of the toolbox, the spring-loaded return means being used in combination with an auxiliary manual return mechanism for manually retracting said cover.

2. The toolbox with built-in-roll-top tonneau cover, further including a tonneau cover access panel disposed adjacent the front wall of the cargo bed and extending across a top rear portion of the tool-box.

3. The toolbox with built-in-roll-top tonneau cover according to claim 1, wherein the toolbox includes a rack for mounting at least one utility device.

4. The toolbox with built-in-roll-top tonneau cover according to claim 1, wherein the first tapered channel further includes a substantially rectangular extension edge adjoining an end of the first tapered channel for mating attachment with an adjacent recessed notch of a successive slat, and the second tapered channel including a substantially rectangular recessed notch for receiving an extended edge of a successive slat to form a reinforced connection between successive slats.

5. The toolbox with built-in-roll-top tonneau cover according to claim 1, wherein the reinforced rubber connector assembly comprises a first and second substantially U-shaped bracket and a substantially rectangular reinforced rubber element.

6. A toolbox with built-in-roll-top tonneau cover for a truck having an open cargo bed defined by a substantially flat bottom having a front portion and a rear portion, two side walls, a front wall at the front portion and a tailgate at the rear portion, comprising:
- a toolbox adapted to be secured to the bottom of the cargo bed at the rear portion, said toolbox having a central front side opening and an interior portion, said toolbox further including a externally extending drain line and a rack for mounting at least one utility device;
- a roll top tonneau cover rotatably mounted and secured within the interior portion of the tool box, whereby the cover is operatively removed from the central front side opening of the toolbox for concealing the cargo bed in an extended state, said roll top tonneau cover having a plurality of successive and interconnected slats, each of said plurality of interconnected slats includes a reinforced rubber connector assembly for interconnecting each of said plurality of slats at a first and second adjoining edge, said first and second adjoining edge having a respective first and second tapered channel for frictionally securing the reinforced rubber connector assembly therebetween;
- a first and second U-shaped track, each said track substantially extending from the front portion to the rear portion of the cargo bed and adapted to be respectively mounted on top edges of the two side walls, each said track having a preselected coefficient of friction for minimizing friction between contact surfaces of the cover and each track;
- spring-loaded return means for returning the tonneau cover to a retracted position within the interior portion of the toolbox, the spring-loaded return means being used in combination with an auxiliary manual return mechanism for manually retracting said cover.

7. The toolbox with built-in-roll-top tonneau cover according to claim 6, further including an access panel mechanically secured to a bottom rear portion of the toolbox for obtaining access to the roll-top tonneau cover.

8. A toolbox with built-in-roll-top tonneau cover for a truck having an open cargo bed defined by a substantially flat bottom having a front portion and a rear portion, two side walls, a front wall at the front portion and a tailgate at the rear portion, comprising:
- a toolbox adapted to be secured to the bottom of the cargo bed at the rear portion, said toolbox having a central front side opening and an interior portion, said toolbox further including a externally extending drain line and a rack for mounting at least one utility device;
- a roll top tonneau cover rotatably mounted and secured within the interior portion of the tool box, whereby the cover is operatively removed from the central front side opening of the toolbox for concealing the cargo bed in an extended state, said roll top tonneau cover having a plurality of successive and interconnected slats, each of said plurality of interconnected slats includes a reinforced rubber connector assembly for interconnecting each of said plurality of slats at a first and second adjoining edge, said first and second adjoining edge having a respective first and second tapered channel for frictionally securing the reinforced rubber connector assembly therebetween, wherein the first tapered channel further includes a substantially rectangular extension edge adjoining an end of the first tapered channel for connection and mating attachment with an adjacent recessed notch of a successive slat, and the second tapered channel including a substantially rectangular recessed notch for receiving an extended edge of a successive slat to form a reinforced connection between successive slats;
- a first and second U-shaped track, each said track substantially extending from the front portion to the rear portion of the cargo bed and adapted to be respectively mounted on top edges of the two side walls, each said track having a preselected coefficient of friction for minimizing friction between contact surfaces of the cover and each track;
- spring-loaded return means for returning the tonneau cover to a retracted position within the interior portion of the toolbox, the spring-loaded return means being used in combination with an auxiliary manual return mechanism for manually retracting said cover.

* * * * *